United States Patent
Colby

(10) Patent No.: US 8,651,152 B2
(45) Date of Patent: Feb. 18, 2014

(54) TREAD BAND FOR RETREADED TIRE

(75) Inventor: E. Bruce Colby, Greenville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/381,011

(22) PCT Filed: Jun. 30, 2009

(86) PCT No.: PCT/US2009/049177
§ 371 (c)(1), (2), (4) Date: Dec. 27, 2011

(87) PCT Pub. No.: WO2011/002446
PCT Pub. Date: Jan. 6, 2011

(65) Prior Publication Data
US 2012/0103489 A1 May 3, 2012

(51) Int. Cl.
*B60C 11/02* (2006.01)

(52) U.S. Cl.
USPC .................. 152/209.5; 152/209.6; 156/96

(58) Field of Classification Search
USPC .......... 152/209.5–209.6, 176, 209.19; 156/96
See application file for complete search history.

(56) References Cited

U.S. PATENT DOCUMENTS

| | | | |
|---|---|---|---|
| 2,609,026 A | 9/1952 | Luchsinger-Caballero | |
| 3,783,924 A | 1/1974 | Pelletier | |
| 3,884,740 A | 5/1975 | Schelkmann | |
| 3,895,985 A | 7/1975 | Schelkmann | |
| 3,935,045 A | 1/1976 | Wolfe | |
| 3,963,066 A | 6/1976 | Schwartz et al. | |
| 4,185,056 A | 1/1980 | Detwiler | |
| 4,196,764 A | 4/1980 | Skidmore | |
| 4,276,103 A | 6/1981 | Wolfe | |

(Continued)

FOREIGN PATENT DOCUMENTS

| | | |
|---|---|---|
| AU | 00236346 | 6/1959 |
| CN | 1286661 A | 3/2001 |

(Continued)

OTHER PUBLICATIONS

PCT/US2009/049177 International Search Report and Written Opinion dated Sep. 9, 2009, 7 pgs.

(Continued)

*Primary Examiner* — Richard Crispino
*Assistant Examiner* — Kendra Shin
(74) *Attorney, Agent, or Firm* — Hahn Loeser & Parks LLP

(57) ABSTRACT

Included are tread bands for use on retreaded tires and methods for retreading a tire using such tread bands. Embodiments of such tread bands include a primary groove having a top opening that is open to a ground contacting front face of the tread band and a secondary groove having a bottom opening that is open to a back face of the tread band. The groove top of the secondary groove is higher than a groove bottom of the primary groove so that the secondary groove top is opened to the ground contacting front face of the tread band prior to disappearance by wear of the primary groove. Particular embodiments may also further include an overflow reservoir having a reservoir opening that is open to the back face of the tread band, the reservoir opening being positioned adjacent to an edge of the secondary groove bottom opening.

15 Claims, 4 Drawing Sheets

(56) References Cited

U.S. PATENT DOCUMENTS

| | | | |
|---|---|---|---|
| 5,275,218 | A | 1/1994 | Nakayama et al. |
| 5,307,854 | A | 5/1994 | Brewer |
| 5,445,691 | A | 8/1995 | Nakayama et al. |
| 5,603,366 | A * | 2/1997 | Nakayama et al. ........ 152/209.6 |
| 6,253,815 | B1 | 7/2001 | Kemp et al. |
| 6,264,779 | B1 | 7/2001 | Cappelli et al. |
| 7,128,794 | B2 | 10/2006 | Veas |
| 7,252,728 | B2 | 8/2007 | Weydert et al. |
| 2002/0005256 | A1 | 1/2002 | Fischer |
| 2002/0040755 | A1 | 4/2002 | Chamoy |
| 2003/0211186 | A1 | 11/2003 | Chamoy |
| 2004/0007300 | A1 * | 1/2004 | Foucher .................. 152/209.17 |
| 2004/0256057 | A1 | 12/2004 | Gridley et al. |
| 2006/0118223 | A1 | 6/2006 | Maeda |
| 2007/0144641 | A1 | 6/2007 | Nguyen et al. |
| 2008/0023116 | A1 | 1/2008 | Mayni et al. |

FOREIGN PATENT DOCUMENTS

| | | |
|---|---|---|
| CN | 1721174 A | 1/2006 |
| DE | 946956 C | 8/1956 |
| EP | 0097787 A2 | 1/1984 |
| EP | 0335694 A2 | 10/1989 |
| EP | 0730950 A3 | 4/1997 |
| EP | 0858875 A1 | 8/1998 |
| EP | 1800843 A2 | 6/2007 |
| EP | 2028024 A1 | 2/2009 |
| GB | 695562 A | 8/1953 |
| GB | 746375 A | 3/1956 |
| GB | 1552841 A | 9/1979 |
| GB | 2061837 A | 5/1981 |
| JP | 01317807 A | 12/1989 |
| JP | 02-293107 | 4/1990 |
| JP | 03-096407 | 4/1991 |
| JP | H05-155202 | 6/1993 |
| JP | 2003-104010 | 4/2003 |
| JP | 2005-193853 | 7/2005 |
| JP | 2005-199762 | 7/2005 |
| JP | 2005-313764 | 11/2005 |
| JP | 2007-045354 | 2/2007 |
| JP | 2007-172674 | 7/2007 |
| JP | 2007-331597 | 12/2007 |
| JP | 2008-192689 A | 8/2008 |
| JP | 2009-002767 | 1/2009 |
| RU | 2165357 C2 | 4/2001 |
| WO | 2007145150 A1 | 12/2007 |
| WO | 2008054387 A1 | 5/2008 |
| WO | WO 2008054387 A1 * | 5/2008 ............. B29D 30/56 |
| WO | 2008066527 A1 | 6/2008 |
| WO | 2009/072633 | 6/2009 |

OTHER PUBLICATIONS

English Abstract and Machine Translation of WO 2007/145150 A1 obtained from http://www.wipo.int/patentscope on Dec. 22, 2011, 7 pgs.

* cited by examiner

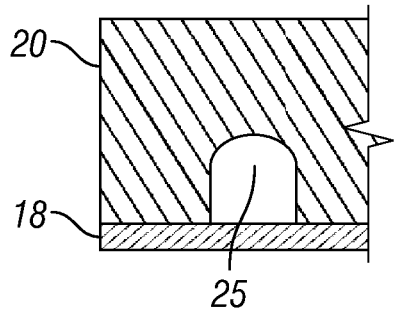
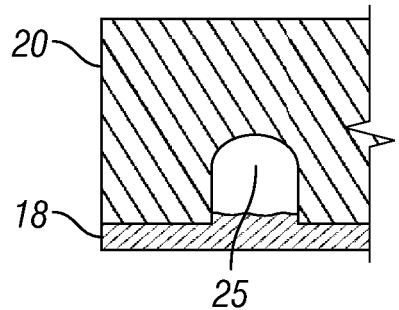
FIG. 2A
(Prior Art)
FIG. 2B
(Prior Art)
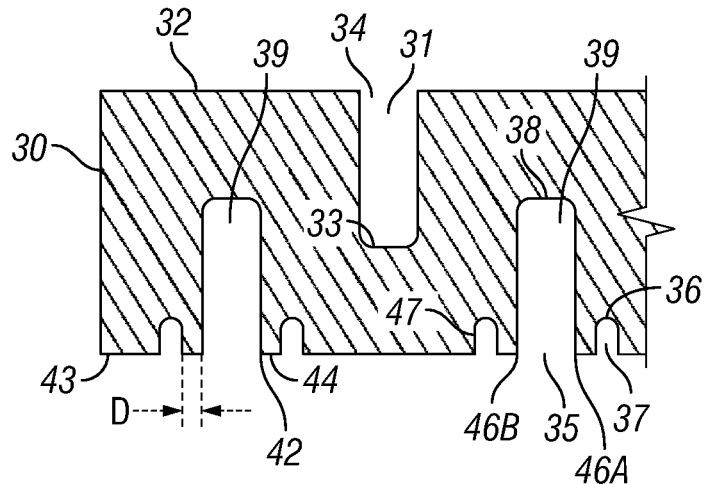
FIG. 3A
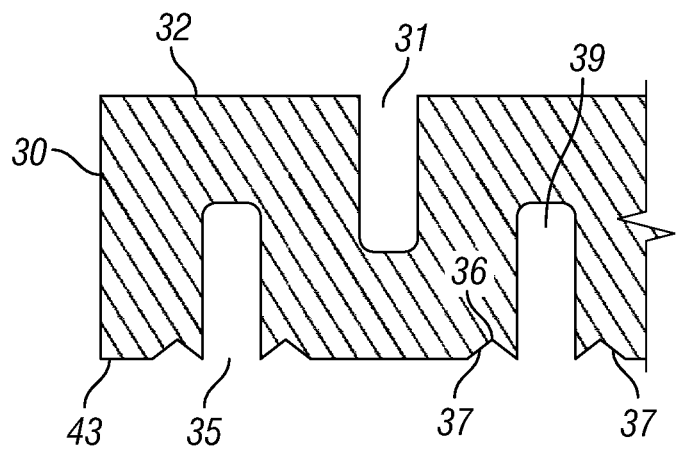
FIG. 3B

TREAD BAND FOR RETREADED TIRE

This application is a National Stage application of International Application No. PCT/US2009/049177, filed Jun. 30, 2009, to which this application claims priority and the benefit of, the disclosure of which is also hereby incorporated by reference.

BACKGROUND OF THE INVENTION

1. Field of the Invention

The invention relates generally to retreaded tires and more specifically to retreaded tires having tread bands with grooves open to the front face and grooves open to the back face of the tread band.

2. Description of the Related Art

When tires become worn, they can be restored with new tread. Large truck tires and bus tires, for example, are typically retreaded as part of a routine tire-management program. The carcass of these types of tires is expected to last several hundred thousand miles and be amenable to having a new tread adhered to it several times. Such tires are quite expensive and are therefore bought with the expectation that their high initial costs are offset by the long service life of the carcass and the low comparative cost of retreading. Indeed, the economics included in the selection and purchase of such tires often dictate that the original tires be capable of being retreaded as many as three or four times or more.

A variety of procedures and different types of equipment are available for use in recapping or retreading pneumatic tires. One of the first steps in retreading a worn tire is to remove remaining tread material from the tire carcass, for example, by a procedure known as buffing. Next a layer of green (uncured) rubber, known as "cushion gum," may be applied to the carcass. This layer of uncured rubber may be extruded directly onto or rolled (stitched) onto the carcass. Next, a tread band is applied atop the layer of cushion gum.

In the cold recapping process, the tread band is cured rubber, and has a tread pattern already impressed in its outer and/or inner surface. Such precured bands, as the term is used herein, refer to tread bands that have been cured either fully or to some lesser extent but have undergone to some extent a curing process. The tire is then placed in an autoclave, and heated under pressure for an appropriate time to induce curing of the gum layer, and bonding of the gum layer to the tread and the carcass.

In the hot recapping process, the tread is uncured rubber and typically may have no or very little tread pattern when initially placed on the tire carcass. The tire with the uncured tread is placed in a tire mold and heated under pressure for an appropriate time to cure the gum layer and the tread, to mold the tread with the desired tread pattern, and to cause the gum layer to bond with the tread and the carcass. The term "cure" refers to the formation of cross-links between the elastomer molecules in the rubber compound, otherwise known as vulcanization.

SUMMARY OF THE INVENTION

Particular embodiments of the present invention include tread bands for use on retreaded tires, retreaded tires having such tread bands and methods for retreading a tire using such tread bands. Such embodiments include a tread band for bonding to a bonding surface of a tire being retreaded. The tread band may include a primary groove having a top opening that is open to a ground contacting front face of the tread band and a secondary groove having a bottom opening that is open to a back face of the tread band. The groove top of the secondary groove is higher than a groove bottom of the primary groove so that the secondary groove top is opened to the ground contacting front face of the tread band prior to disappearance by wear of the primary groove. Particular embodiments may also further include an overflow reservoir having a reservoir opening that is open to the back face of the tread band, the reservoir opening being positioned adjacent to an edge of the secondary groove bottom opening.

Particular embodiments include retreaded tires having a crown section, bead portions, and sidewalls extending between the bead portions and crown. The tread band is bonded to the crown section of the tire and may include a primary groove having a top opening that is open to a ground contacting front face of the tread band and a secondary groove having a bottom opening that is open to a back face of the tread band. The groove top of the secondary groove is higher than a groove bottom of the primary groove so that the secondary groove top is opened to the ground contacting front face of the tread band prior to disappearance by wear of the primary groove. The tread band of the retread tire of particular embodiments may further include an overflow reservoir having a reservoir opening that is open to the back face of the tread band, the reservoir opening being positioned adjacent to an edge of the secondary groove bottom opening.

Particular embodiments include methods for retreading a tire, one such method being providing a base portion of a tire to be retreaded, the base portion comprising a crown section, bead portions, and sidewalls extending between the bead portions and the crown section, the crown section including a prepared surface for bonding a tread band thereto. The method may further include providing a tread band, the tread band comprising a primary groove having a top opening that is open to a ground contacting front face of the tread band and a secondary groove having a bottom opening that is open to a back face of the tread band. The groove top of the secondary groove is higher than a groove bottom of the primary groove so that the secondary groove top is opened to the ground contacting front face of the tread band prior to disappearance by wear of the primary groove. The tread band used in the method may further include an overflow reservoir having a reservoir opening that is open to the back face of the tread band, the reservoir opening being positioned adjacent to an edge of the secondary groove bottom opening. Additionally the method may include bonding the tread band to the prepared surface.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIGS. 2A and 2B are partial cross-sectional views of an exemplary tread band before and after being cured during a retreading process.

FIGS. 3A-3C are partial cross-sectional views of exemplary tread bands in accordance with the present invention.

DETAILED DESCRIPTION OF PARTICULAR EMBODIMENTS

Particular embodiments of the present invention include precured tread bands for bonding to the carcass of a tire being retreaded and the retreaded tires having such tread bands bonded thereto. Other embodiments include methods for bonding such tread bands to a tire being retreaded. The tread bands that are bonded to the tire carcass have grooves that open to the front face of the tread band but also have grooves that open to the back face of the tread band as will be later described. A problem that occurs with such grooves is that during the bonding process, some of the bonding material flows into these back-opening grooves partially filling them and thereby decreasing their usefulness. To solve this problem, particular embodiments of the present invention include an overflow reservoir adjacent to these back-opening grooves so that the overflow reservoir fills with the bonding material preferentially over the grooves.

Figure 1:
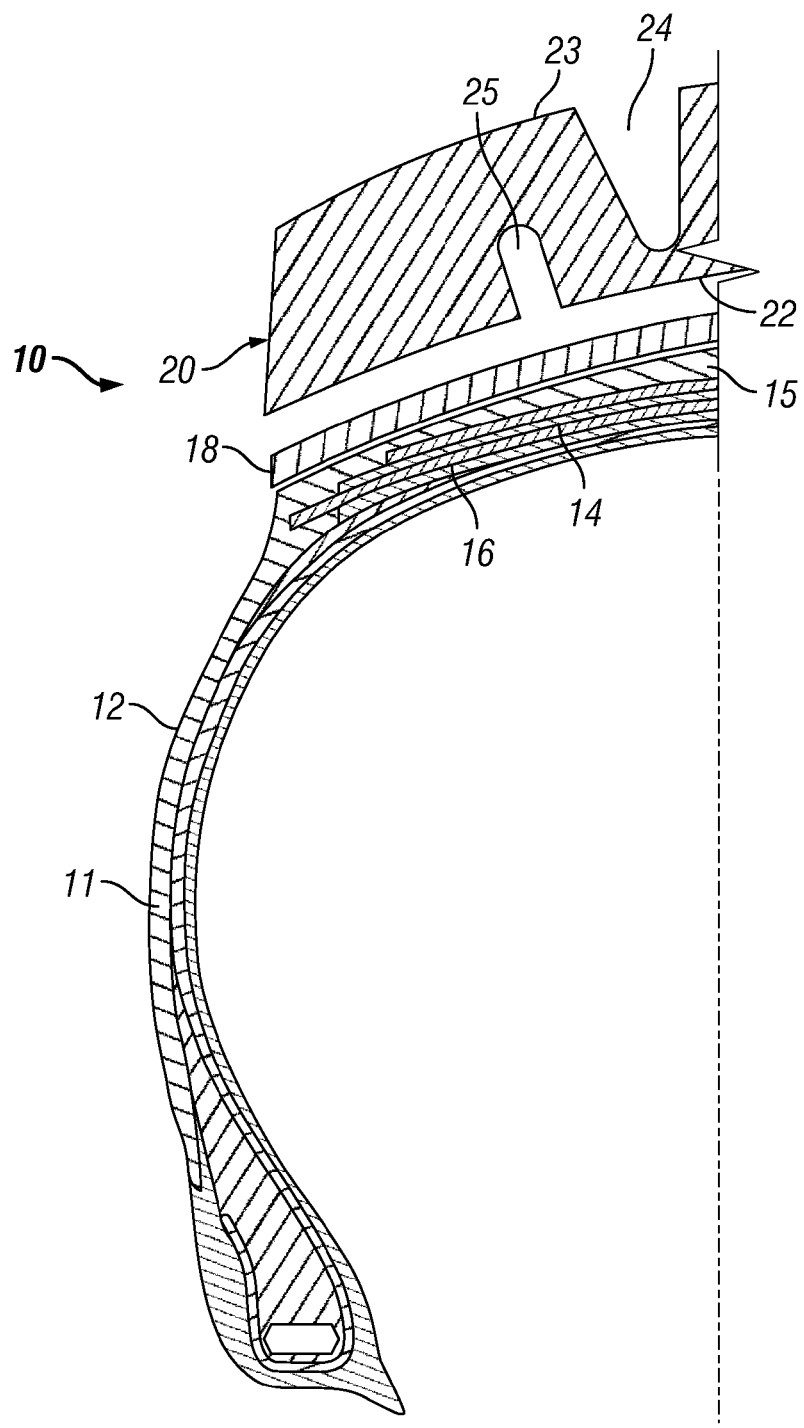
FIG. 1 is a partial cross-sectional partially exploded view of an exemplary retread tire of the prior art.

FIG. 1 is a partial cross-sectional partially exploded view of an exemplary retread tire of the prior art. The retread tire 10 is shown comprising a tire carcass 12 having a crown section 14, a reinforcement package 16 and a sidewall section 11. The retread tire further includes a cushion gum layer 18 and a precured tread band 20. The cushion gum layer 18 is an example of the material that may be used to bond the tread band 20 to the crown section 14 area of the retread tire 10.

The precured tread band 20 includes a front face 23 that contacts the ground and provides traction. Primary tread grooves 24 open to the front face 23 of the tread band. The tread band 20 further includes the back face 22 that is bonded to the crown section 14 of the tire 10 by the cushion gum layer 18. Secondary grooves 25 open to the back face of the tread band 20.

Since the secondary grooves 25 molded into the tread band 20 are open to the back face 22 of the tread band, these secondary grooves do not provide usable tread depth or volume until the tread band 20 is worn to a depth that opens the secondary groove 25 to the front face. As the primary groove 24 wears away, the secondary groove 25 becomes exposed and open to the front face 23 to provide the void volume and/or depth of the exposed groove in the tread. This allows the tread band 20 to be worn down to a level much closer to the rear face 22 of the tread band, allowing more of the tread band to be utilized before the tire is discarded or again retreaded.

However, if during the curing process some of the cushion gum 18 material (or whatever the bonding material may be) flows into the secondary groove 25, then the advantage of allowing more of the tread band to be utilized before the tire is discarded or again retreaded is reduced because the useful depth of the secondary groove may have been reduced with the cushion gum material. FIGS. 2A and 2B are partial cross-sectional views of an exemplary tread band before and after being cured during a retreading process.

As may be seen in FIG. 2A, the tread band rests upon the cushion gum layer 18 before the retreaded tire has been cured. During the curing process, the tire being retreaded is placed in an autoclave and heated under pressure for an appropriate time to induce curing (formation of cross-links between the elastomer molecules in the cushion gum, tire carcass and tread band) in the rubber of the cushion gum layer and the bonding of the cushion gum layer to the tread and the carcass. During the heating process in the autoclave, the cushion gum material softens and, as a result of the combination of tread curvature change and the curing pressure, the cushion gum flows into the secondary groove.

FIG. 2B illustrates how the cushion gum 18 material flowed into the secondary groove 25, partially filling it and reducing its depth. With the depth of the secondary groove 25 reduced, the useful life of the tread is also reduced since that portion of the groove that has been filled with the cushion gum is no longer available as open groove.

As already noted, to solve the problem of the cushion gum or other bonding material partially filling the grooves open to the back face of the tread band during the bonding step of the retreading process, particular embodiments of the present invention include a tread band having an overflow reservoir adjacent to an edge of the groove bottom opening. The tread bands of the present invention include a primary groove having a top opening that is open to the ground contacting front face of the tread band and a secondary groove having a bottom opening that is open to a back face of the tread band. The groove top of the secondary groove is higher than the groove bottom of the primary groove so that the secondary groove top is opened to the ground contacting front face of the tread band prior to disappearance by wear of the primary groove. (While it is known to vent or otherwise provide a small opening between the top of the secondary groove and the front face of the tread band, such secondary grooves are still considered herein to be closed to the ground contacting front face of the tread band until the secondary groove itself is opened to the front face through wear, not just a vent.)

In particular embodiments, the tread band further includes an overflow reservoir that is adjacent to a first edge of the secondary groove bottom opening. The overflow reservoir includes a reservoir opening that is open to the back face of the tread band, just as is the secondary groove bottom opening. Then, during the curing stage of the retread process, the bonding material, e.g., cushion gum, flows preferentially into the overflow reservoir and not into the secondary groove.

Figure 3C:
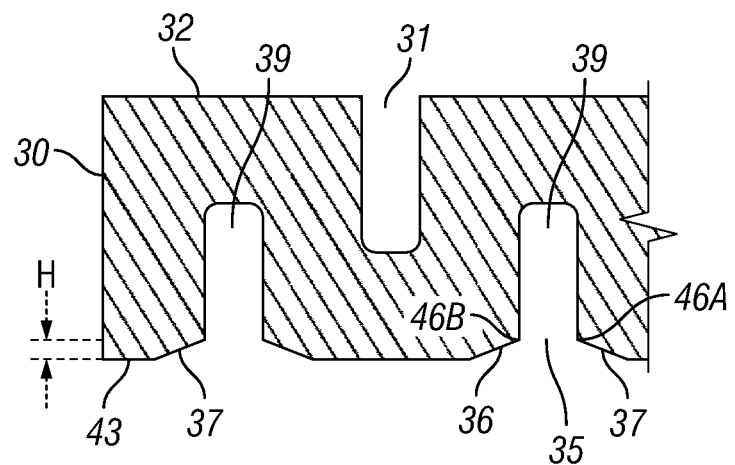

FIGS. 3A-3C are partial cross-sectional views of exemplary tread bands in accordance with the present invention. The exemplary tread band 30 shows a primary groove 31 having a top 34 that is open to the ground contacting front face 32 of the tread band. Also shown is a secondary groove 39 having a bottom opening 35 that is open to the back face 43 of the tread band 30. As may be noted, the groove top 38 of the secondary groove 39 is higher (closer to the ground contacting face of the tread band) than the groove bottom 33 of the primary groove 31. This arrangement provides that as the tire wears, the secondary groove top 38 will open to the front face 32 of the tread band prior to the disappearance by wear of the primary groove 31.

These exemplary tread bands 30 further show an overflow reservoir 36 having a reservoir opening 37 that is open to the back face 43 of the tread band 30. The reservoir opening 37 is positioned adjacent to an edge 46A of the secondary groove bottom opening 35. Particular embodiments may further include an additional overflow reservoir 47 having an opening to the back face 43 of the tread band 30, the additional reservoir opening being positioned adjacent to an opposite edge 46B of the secondary groove bottom opening 35.

Particular embodiments of the present invention as shown in the exemplary tread band of FIG. 3A, may include a separation distance d between the adjacent edges of the overflow reservoir opening 37 and the secondary groove bottom opening 35. If the separation distance d becomes too great, then the overflow reservoir will lose its efficiency in preferentially filling with the bonding material during the curing step of the retreading process. In particular embodiments of the present invention, this distance is limited to being less than 10 mm or in other embodiments, less than 5 mm or less than 3 mm. In other embodiments, this distance may be limited to between 10 mm and 1 mm, between 10 mm and 0.5 mm or between 5 mm and 1 mm.

In particular embodiments, the depth of the overflow reservoir may be limited. In such embodiments, the depth of the overflow reservoir, that is the distance between the reservoir opening and the top of the overflow reservoir, is less than 10 mm or in other embodiments, less than 5 mm. In other embodiments the depth may be limited to between 8 and 1 mm or between 3 and 1 mm.

As shown in FIG. 3B the distance between the adjacent edges of the overflow reservoir opening and the secondary groove bottom opening may be zero. FIG. 3C further shows an overflow reservoir 36 formed by flaring an edge 46A of the secondary groove bottom opening 35. The height of the overflow reservoir formed in this manner may be limited to less than 5 mm or in other embodiments, less than 3 mm, less than 2 mm or less than 1 mm. The height of the overflow reservoir in such embodiments is determined as the height h between the edge 46A of the secondary groove bottom opening 35 and the back face 43 of the tread band 30.

It should be noted that even though the secondary grooves 39 shown in FIG. 3A-3C are arranged laterally across the ground contacting face of the tread band and may appear to be continuous circumferentially around the tire that has been retreaded with such a tread band, the invention is not so limited to such a groove. Indeed such a groove may run laterally across the tire or in any other suitable direction. Particular embodiments of the present invention include an overflow reservoir positioned adjacent to an edge of a secondary groove bottom opening without regard, for example, to the arrangement of the groove on the tread band.

The overflow reservoir may be formed adjacent to the groove in a continuous arrangement or in a discontinuous arrangement. An overflow reservoir formed in a continuous arrangement provides an overflow reservoir that is formed continuously along the length of the secondary groove bottom opening edge. An overflow reservoir formed in a discontinuous arrangement is typically made up of a plurality of openings formed along a length of the secondary groove bottom opening edge so that the back face of the tread band breaks up the formation of the discontinuous overflow reservoir. Examples of such opening include, for example, trenches and holes.

Figure 4:
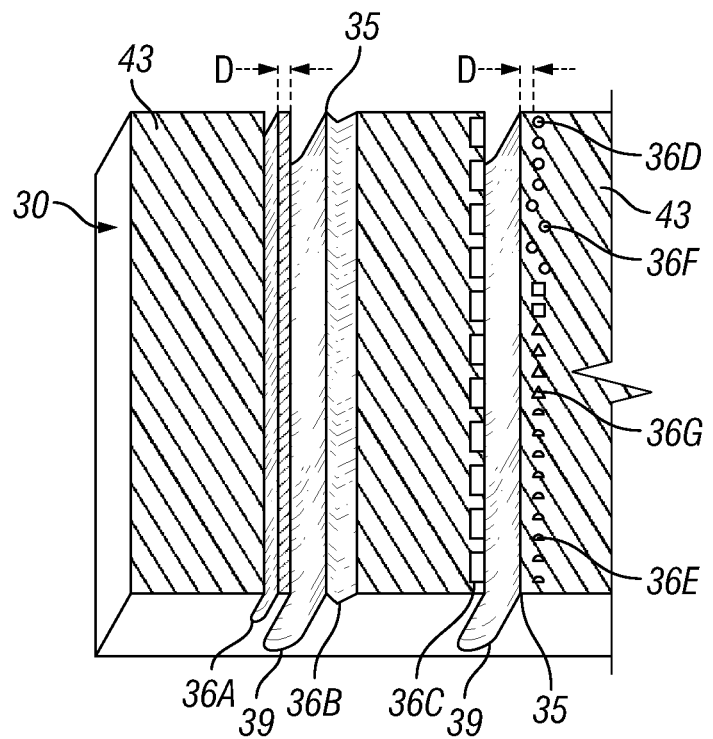
FIG. 4 is a perspective view of the back face of a tread band showing examples of both continuous and discontinuous arrangements of the overflow reservoir.

FIG. 4 is a perspective view of the back face of a tread band showing examples of both continuous and discontinuous arrangements of the overflow reservoir. The tread band 30 includes a secondary groove 39 that opens onto the back face 43 of the tread band 30. An example of an overflow reservoir 36A in a continuous arrangement is provided as the overflow reservoir 36A is formed continuously along the length of the secondary groove bottom opening 35. The adjacent edges of the overflow reservoir 36A and the secondary groove bottom opening 35 are shown to be separated by a distance d in this example. Another example of an overflow reservoir 36B in a continuous arrangement is provided with no separation (d=0) between the adjacent edges of the respective openings.

Figure 5A:
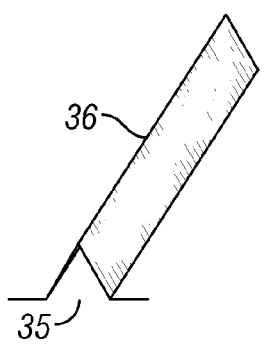
FIG. 5 provides perspective views of exemplary shapes of the overflow reservoir.
Figure 5B:
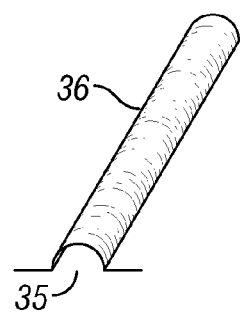
Figure 5C:
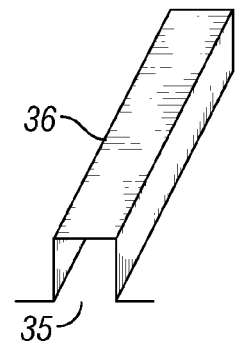

FIG. 5 provides perspective views of exemplary shapes of an overflow reservoir. Illustrated as non-limiting examples are shapes that include triangular, semicircular and rectangular. The triangular shape may be further illustrated in FIG. 3B and the semicircular share illustrated in FIG. 3A in cross-sectional views.

The tread band 30 illustrated in FIG. 4 further provides examples of overflow reservoirs having discontinuous arrangements. In a first example an overflow reservoir 36C having a discontinuous arrangement is shown as a series of trenches in a broken arrangement along the length of the secondary groove bottom opening 35. As may be seen in the example, the back face 43 of the tread band interrupts the overflow reservoir 36C making the reservoir a discontinuous arrangement.

Other examples of overflow reservoirs 36D-36F formed in a discontinuous arrangement are provided. In these examples, the overflow reservoir comprises a plurality of discrete holes opening into the back face 43 of the tread band 30. These holes may be of any shape suitable for the application including, for example, cylindrical, pyramidal, conical and/or cubical. It should be noted that the distance d between the adjacent edges of the reservoir and the secondary groove bottom opening does not have to be constant 36F but in other embodiments, the distance d may be constant.

Figure 6:
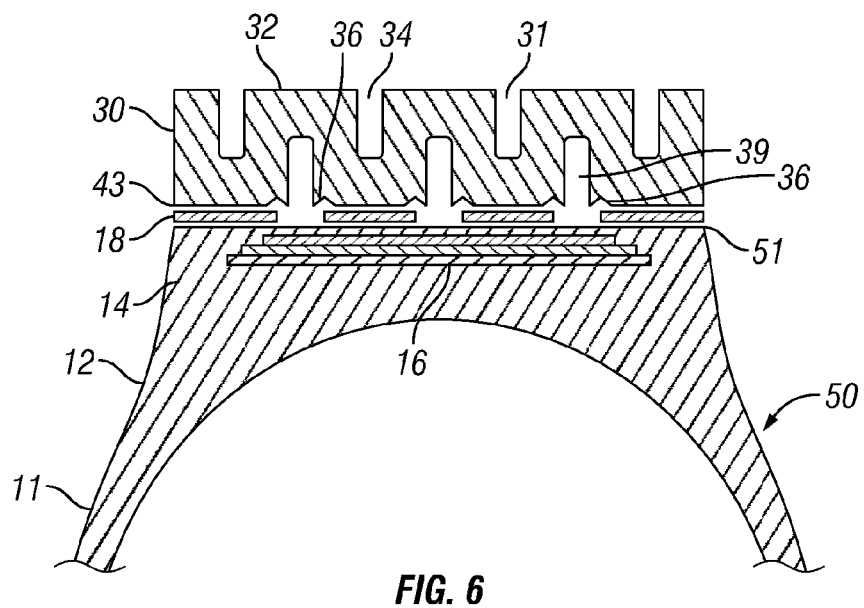
FIG. 6 is a partial cross-sectional partially exploded view of an exemplary embodiment of a retreaded tire having a tread band with an overflow reservoir.

FIG. 6 is a partial cross-sectional partially exploded view of an exemplary embodiment of a retreaded tire having a tread band with an overflow reservoir. While any tire may take advantage of the present invention, some embodiments are limited to heavy duty tires such as found on tractor-trailer rigs, dump trucks, waste hauling trucks, concrete mixer trucks, buses and so forth.

The exemplary retread tire 50 includes a tire carcass 12 having a crown section 14, a reinforcement package 16 and a sidewall section 11. The crown section has been buffed to remove the old worn tread and most of the undertread to provide a bonding surface 51 for bonding the tread band 30 to the crown section 12 of the carcass 12. The retread tire 50 further includes a tread band 30 bonded to the prepared surface 51 with a cushion gum layer 18.

The tread band 30 includes a primary groove 31 and a secondary groove 39 as described above. Also included is an overflow reservoir 36.

Particular embodiments of the present invention may include methods of retreading a tire. Such methods may include providing a base portion of a tire to be retreaded, the base portion comprising a crown section, bead portions, and sidewalls extending between the bead portions and the crown section, the crown section including a prepared surface for bonding a tread band thereto. The surface may be prepared by any method known to one having ordinary skill in the art. One typical method, provided as an example only and not meant to limit the invention, includes buffing or grinding the old tread and much of the undertread away to provide a suitable bonding surface for the tread band.

Such methods may further include providing a tread band. The provided tread band may be any of the tread bands provided by the present invention as claimed herein, exemplary embodiments of which have been disclosed above.

Methods for retreading a tire may further include bonding the tread band to the prepared surface. The bonding may be made by any method known to one having ordinary skill in the art, including the use of a cushion gum layer. The cushion gum is typically a green (uncured) rubber compound. Other materials include, for example, polyurethane or other adhesives. Bonding materials may be spread and/or extruded onto the tread band back face, the prepared bonding surface or combinations thereof. Alternatively, either alone or in combination with other bonding materials, a sheet of bonding material may be placed onto one or both of the bonding surfaces. All of these bonding materials and methods of applying are examples of those known to one having ordinary skill in the art.

These methods may be applied to any type of tire and as such, any type of tire may provide an embodiment of the present invention. However, particular embodiments are especially beneficial for heavy vehicle tires such as for buses and trucks. More specifically embodiments may include truck tires that are steer tires, drive tires or trailer tires.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A tread band for bonding to a bonding surface of a tire being retreaded, the tread band comprising:
   a primary groove having a top opening that is open to a ground contacting front face of the tread band and a secondary groove having a bottom opening that is open to a back face of the tread band, wherein the groove top of the secondary groove is higher than a groove bottom of the primary groove so that the secondary groove top is opened to the ground contacting front face of the tread band prior to disappearance by wear of the primary groove; and
   an overflow reservoir having a reservoir opening that is open to the back face of the tread band, the reservoir opening being positioned adjacent to an edge of the secondary groove bottom opening, wherein the overflow reservoir has a depth extending into the tread from the overflow reservoir opening to a top of the overflow reservoir within the tread, the depth of the overflow reservoir extending into the tread thickness beyond the edge of the secondary groove bottom opening.

2. The tread band of claim 1, further comprising:
   an additional overflow reservoir having an additional reservoir opening that is open to the back face of the tread band, the additional reservoir opening being positioned adjacent to an opposite edge of the secondary groove bottom opening.

3. The tread band of claim 1, wherein a distance between adjacent edges of the reservoir opening and the secondary groove bottom opening is less than 1 cm.

4. The tread band of claim 3, wherein the distance is less than 0.5 cm.

5. A tread band of claim 3, where the distance is between 10 mm and 0.5 mm.

6. The tread band of claim 1, wherein the depth is less than 10 mm.

7. The tread band of claim 6, wherein the depth of the reservoir is less than 5 mm.

8. The tread band of claim 1, wherein the overflow reservoir is formed adjacent to the secondary groove bottom opening in a continuous arrangement.

9. The tread band of claim 1, wherein the overflow reservoir is formed adjacent to the secondary groove bottom opening in a discontinuous arrangement.

10. The tread band of claim 9, wherein the overflow reservoir comprises a plurality of discrete holes opening to the back face of the tread band, each hole having an adjacent edge to the secondary groove bottom opening separated from the first edge of the secondary groove bottom opening at a distance of no more than 1 cm.

11. The tread band of claim 10, wherein the holes are cylindrically shaped.

12. The tread band of claim 9, wherein the overflow reservoir comprises a plurality of discrete trenches opening to the back face of the tread band, each trench having an adjacent edge to the secondary groove bottom opening separated from the first edge of the secondary groove bottom opening at a distance of no more than 1 cm.

13. A retreaded tire, the retreaded tire having a crown section, bead portions, and sidewalls extending between the bead portions and crown, a tread band being bonded to the crown section of the tire, the tread band comprising:
   a primary groove having a top opening that is open to a ground contacting front face of the tread band and a secondary groove having a bottom opening that is open to a back face of the tread band, wherein the groove top of the secondary groove is higher than a groove bottom of the primary groove so that the secondary groove top is opened to the ground contacting front face of the tread band prior to disappearance by wear of the primary groove; and
   an overflow reservoir having a reservoir opening that is open to the back face of the tread band, the reservoir opening being positioned adjacent to an edge of the secondary groove bottom opening, wherein the overflow reservoir has a depth extending into the tread from the overflow reservoir opening to a top of the overflow reservoir within the tread, the depth of the overflow reservoir extending into the tread thickness beyond the edge of the secondary groove bottom opening.

14. A method for retreading a tire, the method comprising:
   providing a base portion of a tire to be retreaded, the base portion comprising a crown section, bead portions, and sidewalls extending between the bead portions and the crown section, the crown section including a prepared surface for bonding a tread band thereto;
   providing a tread band, the tread band comprising a primary groove having a top opening that is open to a ground contacting front face of the tread band and a secondary groove having a bottom opening that is open to a back face of the tread band, wherein the groove top of the secondary groove is higher than a groove bottom of the primary groove so that the secondary groove top is opened to the ground contacting front face of the tread band prior to disappearance by wear of the primary groove and the tread band further comprising an overflow reservoir having a reservoir opening that is open to the back face of the tread band, the reservoir opening being positioned adjacent to an edge of the secondary groove bottom opening, and wherein the overflow reservoir has a depth extending into the tread from the overflow reservoir opening to a top of the overflow reservoir within the tread, the depth of the overflow reservoir extending into the tread thickness beyond the edge of the secondary groove bottom opening; and bonding the tread band to the prepared surface.

15. The method of claim 14, further comprising:

applying a bonding material between the tread band and the prepared surface.

\* \* \* \* \*